(12) United States Patent
Gu et al.

(10) Patent No.: US 12,619,307 B2
(45) Date of Patent: May 5, 2026

(54) DISTRIBUTED SYSTEM-ON-A-CHIP FOR HUMAN ACTIVITY RECOGNITION

(71) Applicant: Northwestern University, Evanston, IL (US)

(72) Inventors: Jie Gu, Evanston, IL (US); Yijie Wei, Evanston, IL (US)

(73) Assignee: Northwestern University, Evanston, IL (US)

( * ) Notice: Subject to any disclaimer, the term of this patent is extended or adjusted under 35 U.S.C. 154(b) by 58 days.

(21) Appl. No.: 18/734,246

(22) Filed: Jun. 5, 2024

(65) Prior Publication Data

US 2024/0411369 A1     Dec. 12, 2024

Related U.S. Application Data

(60) Provisional application No. 63/506,537, filed on Jun. 6, 2023.

(51) Int. Cl.
*G06F 3/01*          (2006.01)
(52) U.S. Cl.
CPC .............. *G06F 3/015* (2013.01); *G06F 3/017* (2013.01)
(58) Field of Classification Search
CPC ................................ G06F 3/015; G06F 3/017
USPC ......................................................... 345/156
See application file for complete search history.

(56) References Cited

U.S. PATENT DOCUMENTS

| | | | | |
|---|---|---|---|---|
| 2014/0176801 A1* | 6/2014 | Kang | ................. | H04N 21/4312 |
| | | | | 348/659 |
| 2020/0388397 A1* | 12/2020 | Shoaran | ................. | A61B 5/725 |
| 2021/0397256 A1* | 12/2021 | Barachant | ................ | G06N 3/09 |
| 2022/0218941 A1* | 7/2022 | Vu | ......................... | A61B 5/397 |
| 2023/0185381 A1* | 6/2023 | Cho | ......................... | G06F 1/16 |
| | | | | 345/156 |

OTHER PUBLICATIONS

H. Chen, et al. "Exploring the Relation between EMG Sampling Frequency and Hand Motion Recognition Accuracy", 2017 IEEE International Conference on Systems, Man, and Cybernetics (SMC), Oct. 5-8, 2017.

(Continued)

*Primary Examiner* — Calvin C Ma
(74) *Attorney, Agent, or Firm* — Benesch Friedlander Coplan & Aronoff LLP

(57)          ABSTRACT
In certain aspects, a system-on-a-chip (SoC) for human activity recognition includes a plurality of integrated low-noise amplifiers configured to sense electromyogram (EMG) signals. The SoC includes a mixed-signal circuitry config-ured to receive the EMG signals from the plurality of integrated low-noise amplifiers, wherein the mixed-signal circuitry is configured to digitalize and extract time-domain features from the EMG signals. The SoC includes an arti-ficial intelligence (AI) core comprising a reconfigurable neural network (NN) configured to receive, from the mixed-signal circuitry, the time-domain features that were extracted, wherein the reconfigurable NN is configured to recognize a local gesture based on time-domain features that is extracted. The SoC includes an analog data path circuitry configured to sense distance measurements and to transmit the distance measurements and the local gesture that is recognized.

17 Claims, 8 Drawing Sheets

(56) References Cited

OTHER PUBLICATIONS

J. Auda, et al. "Around the (Virtual) World: Infinite Walking in Virtual Reality Using Electrical Muscle Stimulation", 2019 CHI Conference on Human Factors in Computing Systems (CHI '19). Association for Computing Machinery, 1-8.

A. R. Aslam, et al., "A 10.13uJ/classification 2-channel Deep Neural Network-based SoC for Emotion Detection of Autistic Children", 2020 IEEE Custom Integrated Circuits Conference (CICC), 2020, pp. 1-4.

J. Liu, et al., "A 250kHz-BW 93dB-SNDR 4th-Order Noise-Shaping SAR Using Capacitor Stacking and Dynamic Buffering", 2021 IEEE International Solid-State Circuits Conference, 2021, pp. 369-371.

H. Bhamra et al., "A 24 μW, Batteryless, Crystal-free, Multinode Synchronized SoC "Bionode" for Wireless Prosthesis Control", IEEE Journal of Solid-State Circuits, vol. 50, No. 11, Nov. 2015, pp. 2714-2727.

L. Xia, et al., "0.56 V, -20 dBm RF-Powered, Multi-Node Wireless Body Area Network System-on-a-Chip With Harvesting-Efficiency Tracking Loop", IEEE Journal of Solid-State Circuits, vol. 49, No. 6, Jun. 2014, pp. 1345-1355.

* cited by examiner

800

| | | CICC'20[3] | ISSCC'21 [4] | JSSC'15 [5] | JSSC'14[6] | This Work |
|---|---|---|---|---|---|---|
| Classifier | Technology | 180 | 65 | 180 | 65 | 65 |
| | Area(mm²) | 16 | 1.74 | 2.025 | 2 | 4.5 |
| | Power(uW) | N/A | 86.7 | 24 | 218 | 135 |
| | Task | EEG classification | Bio-signal processing | EMG sensing & control | Wireless body temp sensing | Gesture & body activity classification |
| | Classifier | DNN | NN | N/A | N/A | LSTM/NN |
| | Frequency | N/A | 2.5 MHz | | | 2MHz |
| | SRAM | 16kB | 73kB | | | 40kB |
| | Energy/class | 10.13nJ | 5.25uJ | | | 2.91uJ(FCNN) 7.20 uJ(LSTM) |
| AFE | # of Ch | 2 | N/A | 1 | 1 | 6 |
| | Topology | LNA+ADC | | LNA+ADC | ADC | LNA+FE |
| | Gain(dB) | 50-64 | | 43-57 | N/A | 35-55 |
| | Total | 3.26 | | 7.5 | 3.6 | 18 |
| Comm | Power(uW) | N/A | | 53.6 | 215 | 20 |
| | Data Rate | | | 1Mb/s | 250Kb/s | 300Kb/s |
| | Method | | | RF OOK | RF OOK | PWM |

FIG. 8

DISTRIBUTED SYSTEM-ON-A-CHIP FOR HUMAN ACTIVITY RECOGNITION

CROSS-REFERENCE TO RELATED APPLICATION

The present application claims the benefit of priority under 35 U.S.C. § 119 from U.S. Provisional Patent Application Ser. No. 63/506,537 entitled "Distributed System-on-a-Chip for Human Activity Recognition," filed on Jun. 6, 2023, the disclosure of which is hereby incorporated by reference in its entirety for all purposes.

STATEMENT OF FEDERALLY FUNDED RESEARCH OR SPONSORSHIP

This invention was made with government support under grant numbers CNS1816870 and CCF2208573 awarded by the National Science Foundation. The government has certain rights in the inventions.

TECHNICAL FIELD

The present disclosure generally relates to system-on-a-chip, and more specifically relates to distributed system-on-a-chip for human activity recognition.

BACKGROUND

Virtual Reality (VR) and Augmented Reality (AR) applications have recently experienced significant growth driven by gaming, workplace assistance, and social networking, to name a few. VR/AR offers a new level of virtual immersion to users by seamlessly blending the real and digital worlds. However, current VR/AR systems primarily rely on conventional techniques such as joysticks and IMU gloves along with external cameras for motion tracking. These conventional methods suffer from low resolution for sophisticated gestures from users and use of cameras which often have limited view-of-sight and face challenges in a non-stationary environment.

The description provided in the background section should not be assumed to be prior art merely because it is mentioned in or associated with the background section. The background section may include information that describes one or more aspects of the subject technology.

SUMMARY

According to certain aspects of the present disclosure, a system-on-a-chip for human activity recognition is provided. The system-on-a-chip includes a plurality of integrated low-noise amplifiers configured to sense electromyogram (EMG) signals. The SoC includes a mixed-signal circuitry configured to receive the EMG signals from the plurality of integrated low-noise amplifiers, wherein the mixed-signal circuitry is configured to digitalize and extract time-domain features from the EMG signals. The SoC includes an artificial intelligence (AI) core comprising a reconfigurable neural network (NN) configured to receive, from the mixed-signal circuitry, the time-domain features that were extracted, wherein the reconfigurable NN is configured to recognize a local gesture based on time-domain features that is extracted. The SoC includes an analog data path circuitry configured to sense distance measurements and to transmit the distance measurements and the local gesture that is recognized.

According to other aspects of the present disclosure, a system is provided. The system includes a plurality of system-on-a-chips. Each system-on-a-chip of the plurality of system-on-a-chips includes a plurality of integrated low-noise amplifiers configured to sense electromyogram (EMG) signals. Each system-on-a-chip of the plurality of system-on-a-chips includes a mixed-signal circuitry configured to receive the EMG signals from the plurality of integrated low-noise amplifiers, wherein the mixed-signal circuitry is configured to digitalize and extract time-domain features from the EMG signals. Each system-on-a-chip of the plurality of system-on-a-chips includes an artificial intelligence (AI) core comprising a reconfigurable neural network (NN) configured to receive, from the mixed-signal circuitry, the time-domain features that were extracted, wherein the reconfigurable NN is configured to recognize a local gesture based on time-domain features that is extracted. Each system-on-a-chip of the plurality of system-on-a-chips includes an analog data path circuitry configured to sense distance measurements to a preceding system-on-a-chip and configured to transmit the distance measurements and the local gesture that is recognized.

According to other aspects of the present disclosure, a method is provided. The method includes sensing electromyogram (EMG) signals via a plurality of integrated low-noise amplifiers. The method includes receiving, at a mixed-signal circuitry, the EMG signals from the plurality of integrated low-noise amplifiers, wherein the mixed-signal circuitry is configured to digitalize and extract time-domain features from the EMG signals. The method includes receiving, at artificial intelligence (AI) core comprising a reconfigurable neural network (NN) from the mixed-signal circuitry, the time-domain features that were extracted, wherein the reconfigurable NN is configured to recognize a local gesture based on time-domain features that is extracted. The method includes transmitting, by an analog data path circuitry, the local gesture that is recognized, wherein the analog data path circuitry is configured to sense distance measurements and transmit the distance measurements.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF DRAWINGS

The disclosure is better understood with reference to the following drawings and description. The elements in the figures are not necessarily to scale, emphasis instead being placed upon illustrating the principles of the disclosure.

Moreover, in the figures, like-referenced numerals may designate to corresponding parts throughout the different views.

FIG. 8 depicts a table comparing specifications of the present disclosure with specification of conventional systems.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Neural activities from human physiological signals, e.g., electromyogram (EMG), provide high-resolution and high-fidelity information to user's body movement. Combining local neural activities with global positioning of human limbs provides a promising solution for camera-free high-resolution human activity sensing. Certain aspects of the present disclosure provide a distributed multi-chip solution that simultaneously captures 4D information, i.e., gestures, limb position and continuous temporal movement of body activities of the user. The contributions of the disclosed technology include, but is not limited to: (1) a fully-integrated SoC chip including, but not limited to, neural sensing of EMG signals, distance measurements of human limbs, and a body area communication for multi-chip collaboration, which, for example, can be demonstrated by a 65 nm chip; (2) Reconfigurable AI accelerator for both neural network (NN) and long short-term memory (LSTM) is integrated for low power real-time body activity recognition; (3) A special infrared (IR) daisy-chained communication is provided for low-cost multi-chip collaborative computing.

In certain aspects, a distributed multi-chip solution for camera-free activity sensing is provided and is well poised for AR/VR applications.

System Implementation

Figure 1:
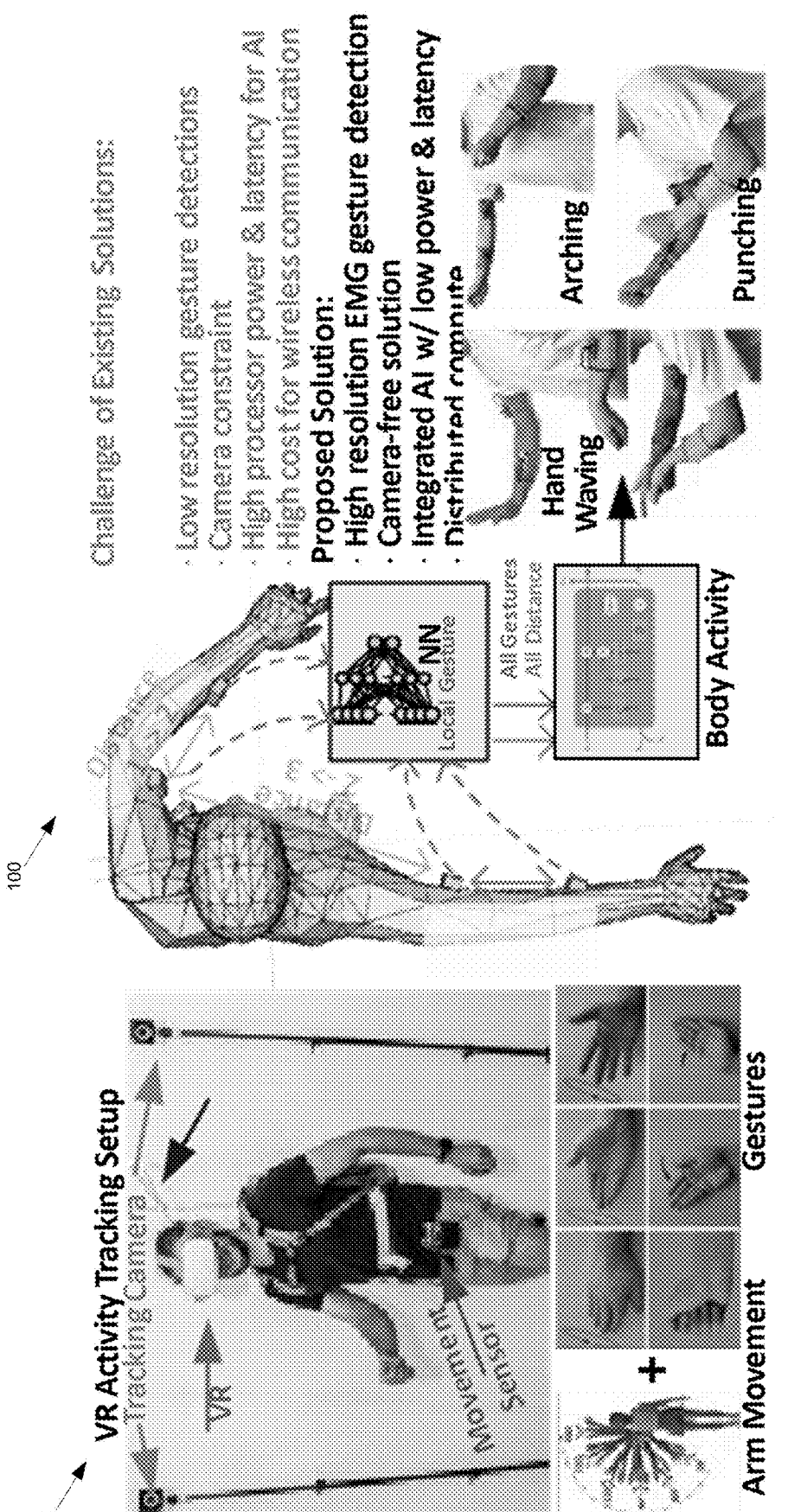
FIG. 1 depicts human body activity tracking for VR/AR application with challenges of conventional technologies compared to solutions of the disclosed technology.

FIG. 1 illustrates human body activity tracking for VR/AR application with challenges of conventional technologies 10 compared to solutions of the disclosed technology. For example, in the present system 100, a plurality of SoC chips (nodes) 12 (in some aspects, up to four SoC chips) can be deployed on users' limb and collaborate on the activity classification. Each body node (e.g., SoC chip) of the plurality of SoC chips 12 detects the user's local gestures by sensing and classifying the EMG signals from specific muscle groups while also measuring the relative distance between neighboring nodes. The distributed information is collected through a chained communication scheme passing into the last node of the plurality of SoC chips 12 for final recognition of a variety of body activities such as, but not limited to, punching, shooting, and arching, detecting both temporal and spatial movement of multiple human limbs. An infrared (IR) data communication and distance measurement circuit are utilized through a daisy-chain protocol for multi-chip collaboration.

Figure 2:
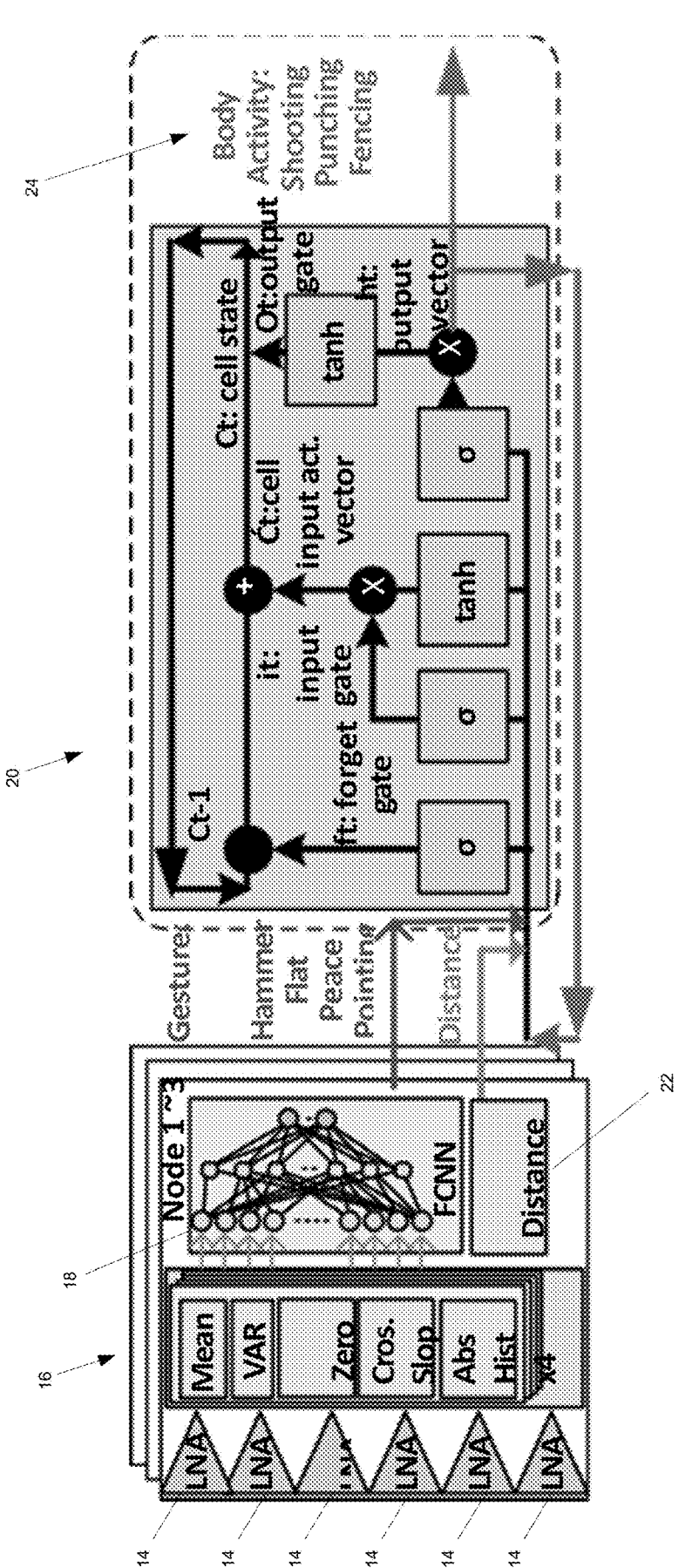
FIG. 2 illustrates local gesture classification through FCNN and LSTM-based body activity classification flow.

The signal flow for acquiring and classifying local body gestures/movements is shown in FIG. 2. In certain aspects, a plurality of fully integrated 6-channel low-noise amplifiers 14 with a tunable gain from 35 dB-55 dB are deployed to sense EMG signals. It should be understood that the plurality of low-noise amplifiers 14 can include any appropriate number of channels and that the tunable gain can be within other appropriate ranges. The collected EMG signals are processed through mixed-signal circuitry 16 for digitalization and extraction of time-domain features, such as mean, variance, zero crossing, and histograms, from each input channel. In certain aspects, a 3-layer fully connected neural network (FCNN) 18 is employed for local gesture recognition based on the extracted EMG features from the mixed-signal circuitry 16. In should be understood that in other aspects, the FCNN can include any appropriate number of layers and is not limited to 3-layers. For a body movement with a temporal series of gestures, e.g. punching, a long short-term memory (LSTM) network 20 is deployed for classification. The LSTM 20 considers all gesture results from the FCNN 18 and distance measurements 22 among (e.g., between) multiple nodes to derive the final classification results 24.

Figure 3:
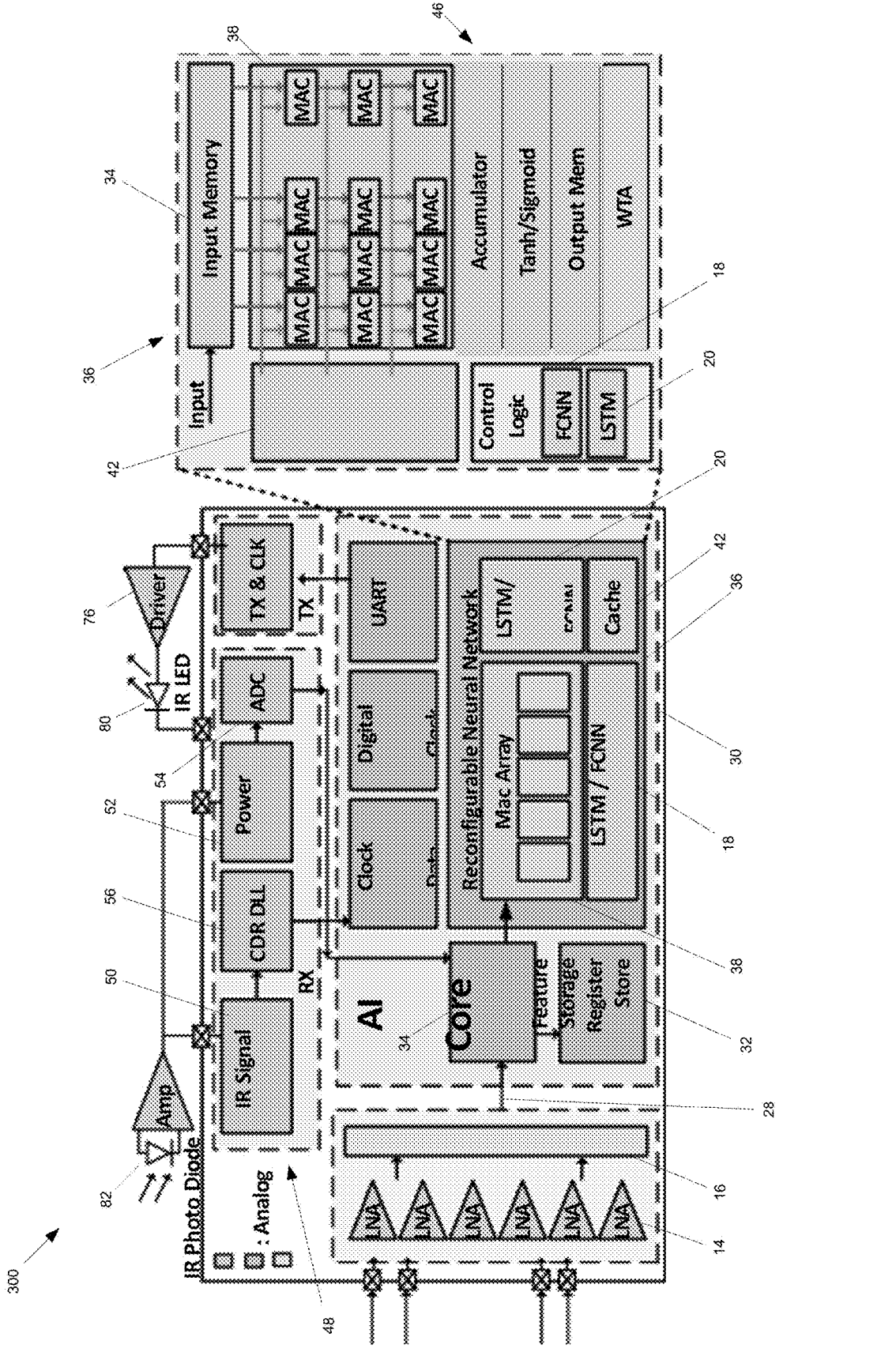
FIG. 3 illustrates a top-level system-on-chip diagram and reconfigurable AI core, according to certain aspects of the disclosure.

FIG. 3 illustrates a top level block diagram 300 of an SoC chip of the plurality of SoC chips 12. After the 6-channel analog front-end (AFE) 26, including the plurality of fully integrated 6-channel low-noise amplifiers 14 and feature extraction from the mixed-signal circuitry 16, time-domain features 28 are sent to an AI core 30, which contains both a classifier 32 and a local feature storage memory 34 for recording data for offline training. The compute engine in the AI core 30 contains a reconfigurable neural network (NN) accelerator 36 which comprises a plurality of Multiply-Accumulate Operations (MACs) 38, for example, 80 MACs, weight SRAM banks 40, and other associated caches 42. As depicted in FIG. 3, the NN accelerator 36 computes both the FCNN 18 and the LSTM 20 along with activation functions 46, e.g., Tanh, Sigmoid, and dedicated process sequence control. For inter-chip communication, the analog data path circuitry 48 includes, for example, IR data transceivers 50, a power detector 52 configured for distance sensing of the distance measurements 22, an ADC 54, and clock-data-recovery (CDR) circuits 56.

Figure 4:
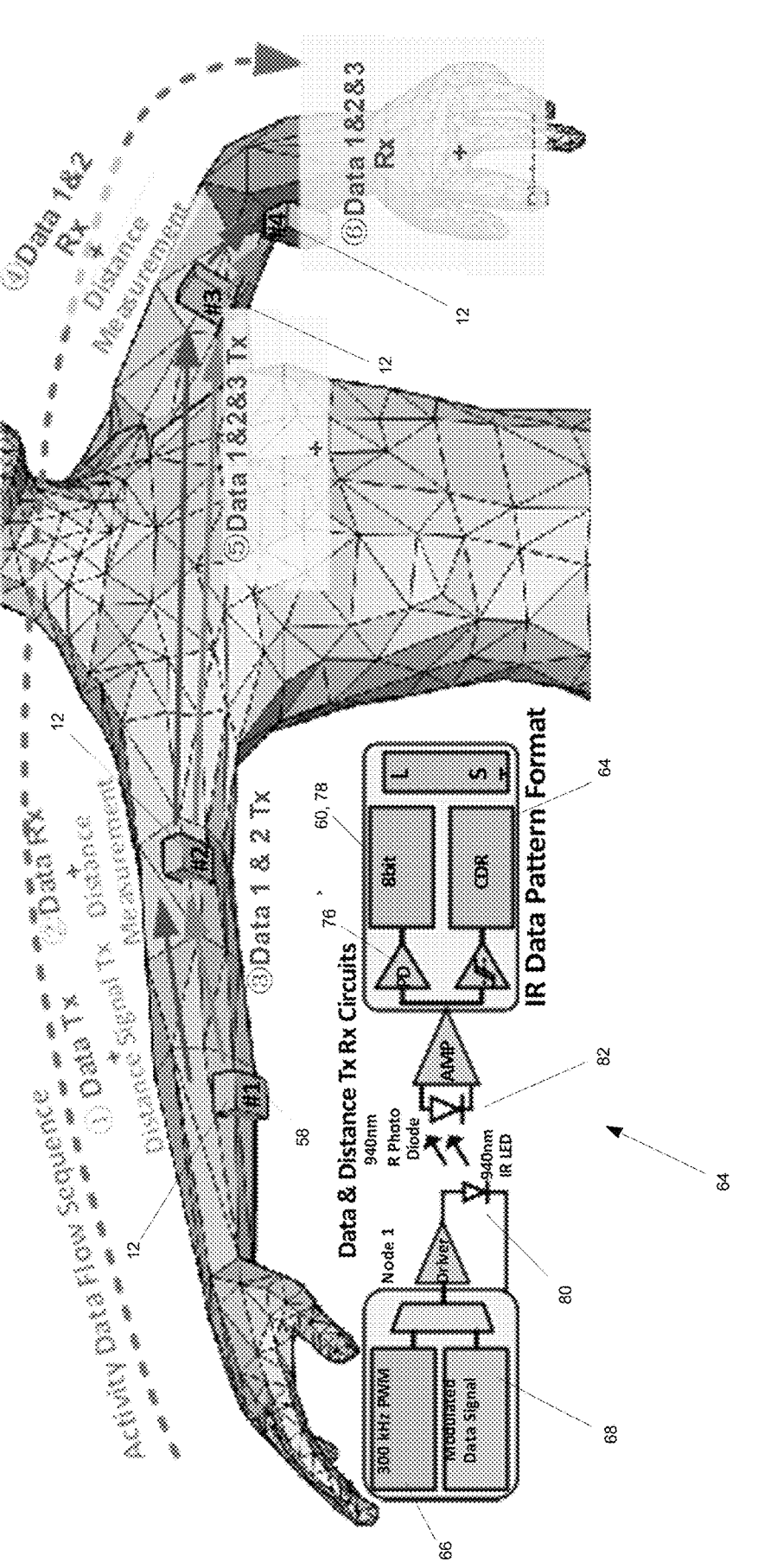
FIG. 4 illustrates a multi-chip communication and distance measurement scheme, according to certain aspects of the disclosure.
Figure 5:
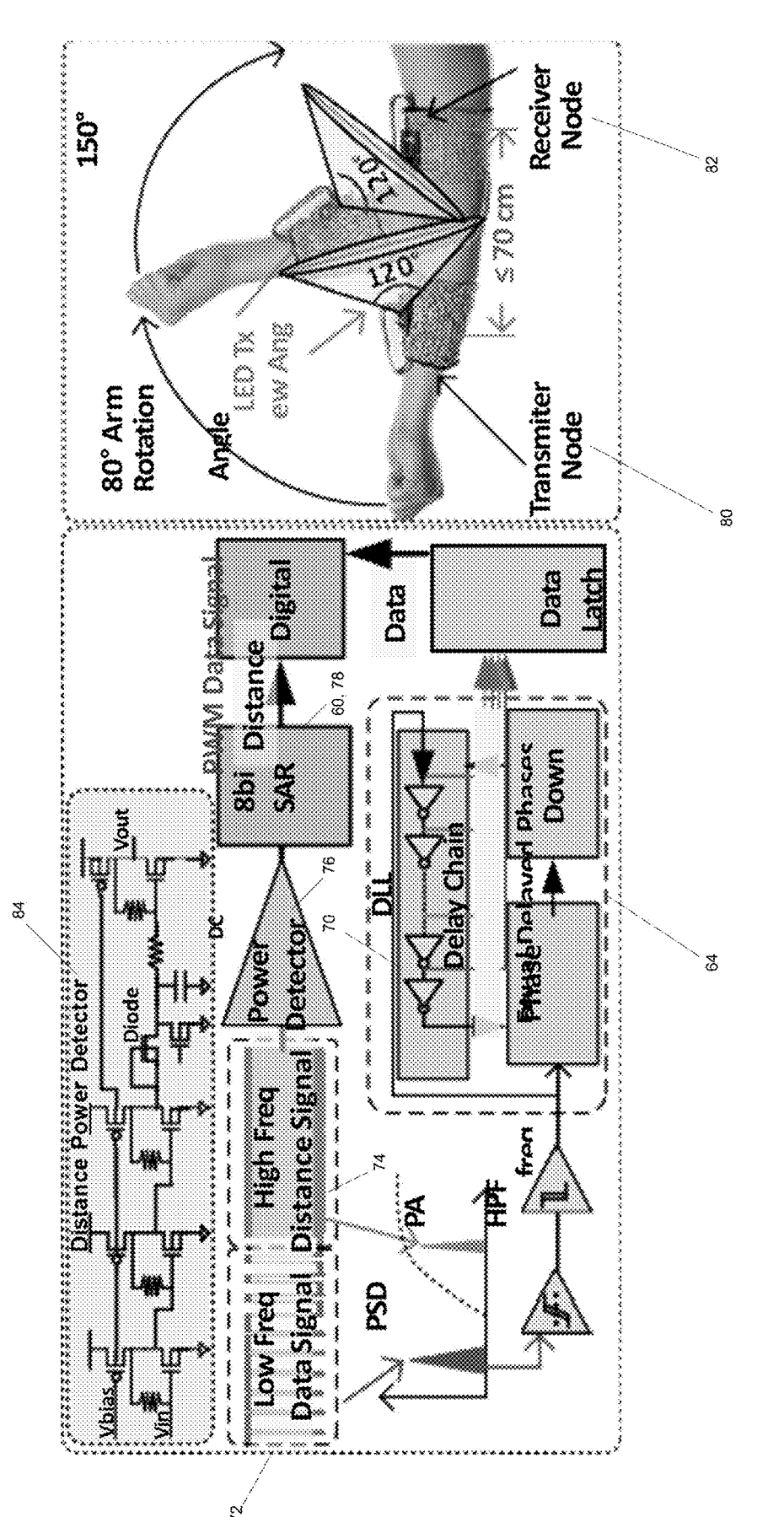
FIG. 5 illustrates a data and distance processing flow diagram (left), a diagram of IR signal transmission view angle with arm rotation and receiver (right).

FIG. 4 illustrates a daisy-chain data communication for sequentially sharing data among each of the SoC chips of the plurality of SoC chips 12 and distance sensing. Each SoC chip of the plurality of SoC chips 12 is programmed with a chip ID 58 representing the communication order (e.g., SoC chip #1 to SoC chip #2 to SoC chip #3 to SoC chip #4). After gesture classification at a local site, each SoC chip (node) of the plurality of SoC chips 12 takes turns to transmit its local result to the next node who receives the data and performs distance measurement to its preceding node. After receiving the data, the receiving node appends its gesture label and distance results to the bit stream 60 and transmits it to the next node. The final node (e.g., SoC chip #4) engages its LSTM network to process the gesture labels and distance measurements from all the nodes to determine the user's body activity in both temporal and spatial dimensions. A verification procedure is used to enhance error tolerance through a verification pattern and sender ID. Data will only be accepted when the receiver matches the sender ID and verification pattern. The daisy-chain communication enables low-power and low-latency data exchange since only neighbors with short distance are communicating with only gesture label and distance shared. The communication circuitry 62 only consumes approximately 20 μW and takes less than approximately 4 ms to finish within four interconnected nodes, for example, suitable for low-cost real-time application. To account for clock mismatch, a CDR circuit 64 utilizing a PWM 66 modulated data signal 68 and a delay lock loop (DLL) 70 is used, as shown in FIG. 5. To minimize interference, for example, 300 kHz can be used for data transmission and 3 MHz can be used for distance measurement separated in time. The data signal 72 is processed through the CDR circuit 64 in the first 250 μs, followed by the distance signal 74 which is processed through a high pass filter, a power detector 76, and converted to 8-bit data 60 by an ADC 78 (e.g., a successive approximation register ADC). As the IR LED 80 (see FIG. 4) transceiver has a 120° illumination angle limitation, the LEDs beams are positioned to cover the receiver 82 at the full range of arm rotation movement to maintain stable communication as shown in FIG. 5. In certain aspects, a distance power detector 84 is used based on the distance-power relationship of IR signals.

Exemplarily Measurement Results

Figure 6:
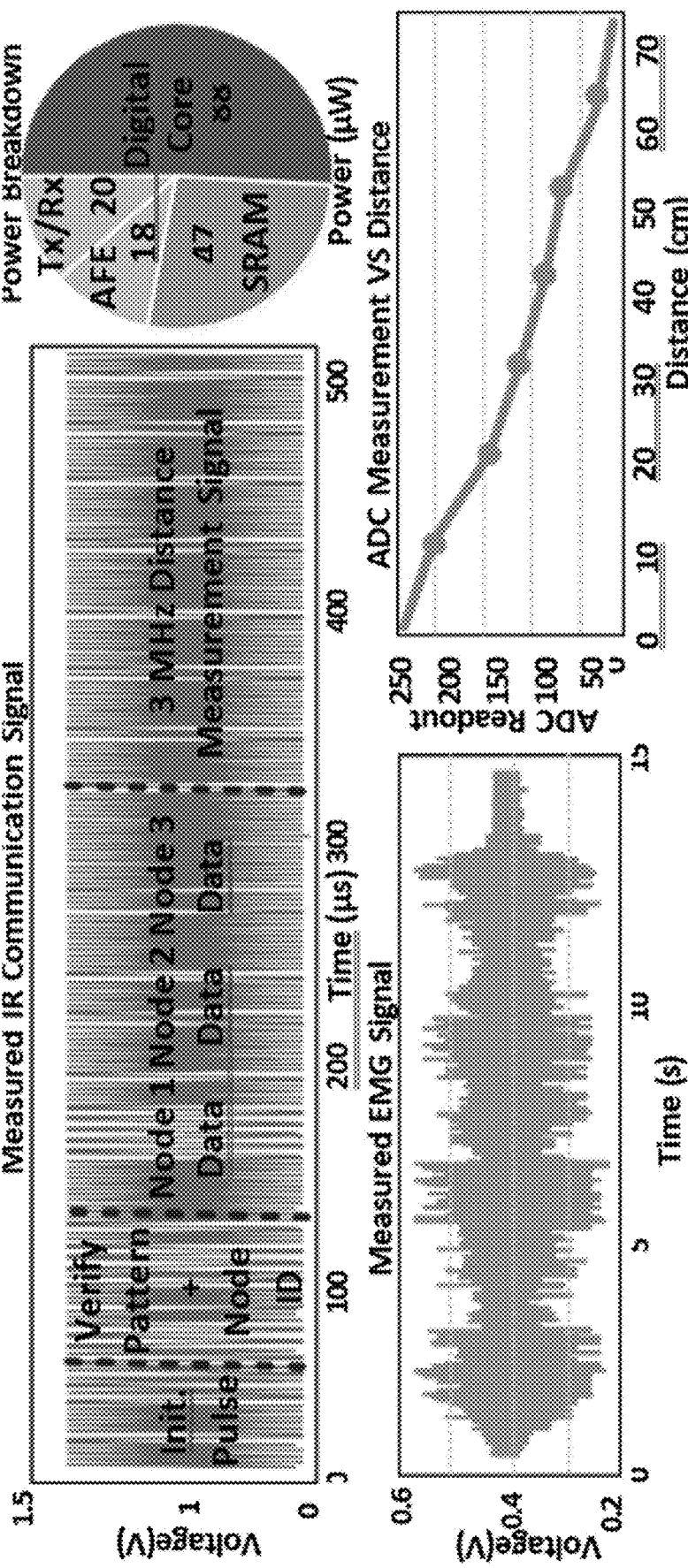
FIG. 6 illustrates measurement results including inter-node communication data signal (top-left), chip power breakdown (top-right), amplified EMG signals (bottom-left), and ADC readout versus distance (bottom-right).

For example, the disclosed technology is implemented on a 65 nm chip. FIG. 6 illustrates the measurement results of IR inter-node communication waveform, including initial signals for receiver's DLL to lock, verification pattern, data signal of first three nodes, and a 3 MHz distance measurement signal, completed within 500 μs for fast communication and distance sensing. The average power of the SoC is 135 μW, dominated by digital AI core which only consumes 88 μW at 2 MHz. The AFE consumes 18 μW while the communication transceivers and CDR consumes 20 μW on average. The measured waveforms of EMG signals from LNA, and the distance readouts from ADC are also illustrated in FIG. 6. The distance based on IR signal is accurately captured within a range of 70 cm, making it suitable for localized body area sensing.

Figure 7:
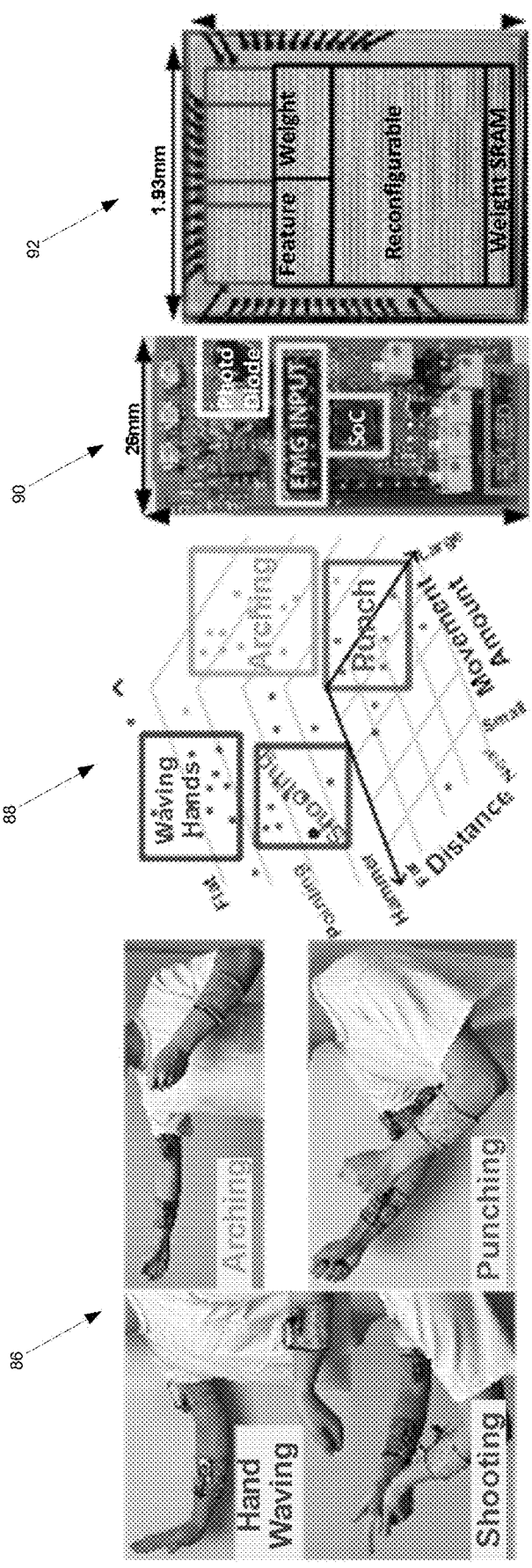
FIG. 7 illustrates a setup of 3 nodes with different activities (left) and classification matrix (middle-left), PCB (middle-right), and die photo (right).

FIG. 7 depicts the demonstration of four example human activities 86 with activity matrix 88, a PCB board 90 comprising a SoC chip of, and a die photo 92. Three sensing nodes were placed on the subject's forearms and upper arm, with the final LSTM node located on the left forearm. FCNN/LSTM models were off-line trained. The multi-dimensional activity classification clusters separated by local gesture, movement and distance show the device achieved, for example, an 85% accuracy on activity classification tasks including hand waving, shooting, arching, and punching. The table 800 illustrated in FIG. 8 compares the disclosed design against conventional techniques showing similar or better energy efficiency. While existing works only focus on single-chip local bio-recording or standalone neural network processing for bio-signals, the disclosed technology, delivers a multi-chip comprehensive solution covering sensing, multi-chip communication and AI classification for camera-free human activity tracking targeting VR/AR applications.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system-on-a-chip for human activity recognition, comprising:
  a plurality of integrated low-noise amplifiers configured to sense electromyogram (EMG) signals;
  a mixed-signal circuitry configured to receive the EMG signals from the plurality of integrated low-noise amplifiers, wherein the mixed-signal circuitry is configured to digitalize and extract time-domain features from the EMG signals;
  an artificial intelligence (AI) core comprising a reconfigurable neural network (NN) configured to receive, from the mixed-signal circuitry, the time-domain features that were extracted, wherein the reconfigurable NN is configured to recognize a local gesture based on time-domain features that is extracted; and
  an analog data path circuitry configured to sense distance measurements and to transmit the distance measurements and the local gesture that is recognized, wherein the analog data path circuitry comprises an IR LED transceiver configured to transmit the distance measurements and the local gesture that is recognized.

2. The system-on-a-chip of claim 1, wherein the AI core comprises a long short-term memory (LSTM) configured to receive the distance measurements and the local gesture that is recognized, wherein the LSTM is configured to derive final classification results based on the distance measurements and the local gesture.

3. The system-on-a-chip of claim 2, wherein the final classification results classify human activities comprising one of waving, shooting, arching, and punching.

4. The system-on-a-chip of claim 1, wherein the plurality of integrated low-noise amplifiers comprise 6 channels with a tunable gain in a range of 35 dB to 55 dB.

5. The system-on-a-chip of claim 1, wherein the reconfigurable NN is a 3-layer fully connected neural network (FCNN).

6. The system-on-a-chip of claim 1, wherein the analog data path circuitry comprises a receiver configured to receive another distance measurement and another local gesture from another system-on-a-chip.

7. A system for human activity recognition, comprising:
  a plurality of distributed system-on-a-chips, wherein each system-on-a-chip comprises:
    a plurality of integrated low-noise amplifiers configured to sense electromyogram (EMG) signals;
    a mixed-signal circuitry configured to receive the EMG signals from the plurality of integrated low-noise amplifiers, wherein the mixed-signal circuitry is configured to digitalize and extract time-domain features from the EMG signals;
    an artificial intelligence (AI) core comprising a reconfigurable neural network (NN) configured to receive, from the mixed-signal circuitry, the time-domain features that were extracted, wherein the reconfigurable NN is configured to recognize a local gesture based on time-domain features that is extracted; and an analog data path circuitry configured to sense distance measurements to a preceding system-on-a-chip and configured to transmit the distance measurements and the local gesture that is recognized, wherein the analog data path circuitry comprises an IR LED transceiver configured to transmit both the distance measurements and the local gesture that is recognized to a next system-on-a-chip.

8. The system of claim 7, wherein the AI core comprises a long short-term memory (LSTM) configured to receive the distance measurements and the local gesture that is recognized.

9. The system of claim 7, wherein the plurality of integrated low-noise amplifiers comprise 6 channels with a tunable gain in a range of 35 dB to 55 dB.

10. The system of claim 7, wherein the reconfigurable NN is a 3-layer fully connected neural network (FCNN).

11. The system of claim 7, wherein each system-on-a-chip further comprises a chip ID representing communication order between each system-on-a-chip of the plurality of distributed system-on-a-chips.

12. The system of claim 11, wherein the analog data path circuitry comprises a receiver configured to receive the distance measurements and the local gesture from the preceding system-on-a-chip.

13. The system of claim 12, wherein the LSTM of a system-on-a-chip comprising a final communication order status is configured to derive final classification results based on the distance measurements and the local gestures, collectively.

14. The system of claim 13, wherein the final classification results classify human activities comprising one of waving, shooting, arching, and punching.

15. A method of human activity recognition, comprising:

sensing electromyogram (EMG) signals via a plurality of integrated low-noise amplifiers;

receiving, at a mixed-signal circuitry, the EMG signals from the plurality of integrated low-noise amplifiers, wherein the mixed-signal circuitry is configured to digitalize and extract time-domain features from the EMG signals;

receiving, at artificial intelligence (AI) core comprising a reconfigurable neural network (NN) from the mixed-signal circuitry, the time-domain features that were extracted, wherein the reconfigurable NN is configured to recognize a local gesture based on time-domain features that is extracted; and transmitting, by an analog data path circuitry, the local gesture that is recognized, wherein the analog data path circuitry is configured to sense distance measurements and transmit the distance measurements, wherein the analog data path circuitry comprises an IR LED transceiver configured to transmit the distance measurements and the local gesture that is recognized.

16. The method of claim 15, further comprising:

receiving, at a long short-term memory (LSTM) of the AI core, the distance measurements and the local gesture that is recognized, wherein the LSTM is configured to derive final classification results based on the distance measurements and the local gesture.

17. The method of claim 15, wherein the analog data path circuitry comprises a receiver configured to receive another distance measurement and another local gesture from another system-on-a-chip.

* * * * *